United States Patent
Kim et al.

(10) Patent No.: US 11,567,491 B2
(45) Date of Patent: Jan. 31, 2023

(54) REINFORCEMENT LEARNING-BASED REMOTE CONTROL DEVICE AND METHOD FOR AN UNMANNED AERIAL VEHICLE

(71) Applicant: INDUSTRY ACADEMY COOPERATION FOUNDATION OF SEJONG UNIVERSITY, Seoul (KR)

(72) Inventors: Yong Guk Kim, Seongnam-si (KR); Sang Yun Shin, Seoul (KR); Yong Won Kang, Seoul (KR)

(73) Assignee: INDUSTRY ACADEMY COOPERATION FOUNDATION OF SEJONG UNIVERSITY, Seoul (KR)

(*) Notice: Subject to any disclaimer, the term of this patent is extended or adjusted under 35 U.S.C. 154(b) by 316 days.

(21) Appl. No.: 16/700,054

(22) Filed: Dec. 2, 2019

(65) Prior Publication Data
US 2020/0183379 A1  Jun. 11, 2020

(30) Foreign Application Priority Data
Dec. 5, 2018 (KR) .................. 10-2018-0155187

(51) Int. Cl.
*B64C 27/08* (2006.01)
*B64C 39/02* (2006.01)
(Continued)

(52) U.S. Cl.
CPC .......... *G05D 1/0011* (2013.01); *B64C 39/024* (2013.01); *G05D 1/101* (2013.01);
(Continued)

(58) Field of Classification Search
None
See application file for complete search history.

(56) References Cited

U.S. PATENT DOCUMENTS 10,152,052 B1 * 12/2018 Lu .................... G06F 3/0346
10,545,495 B2 * 1/2020 Kim .................. G06F 3/014
(Continued)

FOREIGN PATENT DOCUMENTS

KR      20170090603 A    8/2017
KR       101887314 B1    8/2018

OTHER PUBLICATIONS

Hu, Bin et al. "Deep Learning Based Hand Gesture Recognition and UAV Flight Controls", Sep. 2018, Proceedings of the 24th International Conference on Automation &Computing, Newcastle University, Newcastle upon Tyne, UK. (Year: 2018).*
(Continued)

*Primary Examiner* — Aniss Chad
*Assistant Examiner* — Jennifer M Anda (57) ABSTRACT

A device and method for remotely controlling an unmanned aerial vehicle based on reinforcement learning are disclosed. An embodiment provides a device for remotely controlling an unmanned aerial vehicle based on reinforcement learning, where the device includes a processor and a memory connected to the processor, and the memory includes program instructions that can be executed by the processor to determine an inclination direction corresponding to the hand pose of a user, the movement direction of the hand, and the angle in the inclination direction based on sensing data associated with the pose of the hand or the movement of the hand acquired by way of at least one sensor, and determine one of a movement direction, a movement speed, a mode change, a figural trajectory, and a scale of the figural trajectory of the unmanned aerial vehicle according to the determined inclination direction, movement direction, and angle.

11 Claims, 6 Drawing Sheets

(51) Int. Cl.
    *G05D 1/00*      (2006.01)
    *G05D 1/10*      (2006.01)
    *G06F 3/01*      (2006.01)
    *G06V 40/20*     (2022.01)
(52) U.S. Cl.
    CPC .............. *G06F 3/017* (2013.01); *G06V 40/28* (2022.01); *B64C 2201/027* (2013.01); *B64C 2201/146* (2013.01)

(56) References Cited

U.S. PATENT DOCUMENTS

| | | | | |
|---|---|---|---|---|
| 2009/0222149 | A1* | 9/2009 | Murray | B64C 39/024 |
| | | | | 701/2 |
| 2016/0241767 | A1* | 8/2016 | Cho | G06F 3/0346 |
| 2017/0031446 | A1* | 2/2017 | Clark | B64C 39/024 |
| 2019/0056725 | A1* | 2/2019 | Su | G06F 3/04883 |
| 2019/0107846 | A1* | 4/2019 | Roy | G08G 5/0008 |
| 2019/0302903 | A1* | 10/2019 | Atlas | G06F 3/03545 |
| 2019/0389579 | A1* | 12/2019 | Zhou | G06K 9/00604 |
| 2020/0126249 | A1* | 4/2020 | Tang | G06T 7/0002 |
| 2020/0346753 | A1* | 11/2020 | Qian | G06K 9/00355 |

OTHER PUBLICATIONS

Wang, Ziyu et al., "Dueling Network Architectures for Deep Reinforcement Learning", Apr. 5, 2016 (Year: 2016).*

* cited by examiner

REINFORCEMENT LEARNING-BASED REMOTE CONTROL DEVICE AND METHOD FOR AN UNMANNED AERIAL VEHICLE

CROSS-REFERENCE TO RELATED APPLICATIONS

This application claims priority under 35 U.S.C. § 119(a) to Korean Patent Application No. 10-2018-0155187, filed with the Korean Intellectual Property Office on Dec. 5, 2018, the entire disclosure of which is incorporated herein by reference in its entirety.

BACKGROUND

1. Technical Field

The present disclosure relates to a device and method for remotely controlling an unmanned aerial vehicle based on reinforcement learning.

2. Description of the Related Art

An unmanned aerial vehicle (UAV) such as a drone is controlled remotely from the ground without having a pilot on the aircraft itself. Generally, the user uses a radio controller (RC) as a dedicated controller to control the unmanned aerial vehicle. However, the radio controller is difficult to manipulate, and beginners would not be able to operate the controller easily.

As a solution, a camera-based technique of controlling an unmanned aerial vehicle with gestures has been developed. With this technique, however, the rate of recognizing gestures is significantly lowered when the intensity of light is insufficient, a large amount of calculations are needed for recognizing gestures, and it is difficult to generalize the flight trajectory according to the sizes of the gestures. Furthermore, when controlling an unmanned aerial vehicle using figural trajectory gestures is desired, there is the inconvenience of having to mount a depth perception camera or an additional sensor.

SUMMARY

To resolve the problems in the related art described above, an aspect of the present disclosure is to provide a device and method for remotely controlling an unmanned aerial vehicle based on reinforcement learning which allow an intuitive method of controlling of the unmanned aerial vehicle and allow a control of the direction, speed, and flight trajectory with simple manipulations.

To achieve the objective above, an embodiment of the disclosure provides a device for remotely controlling an unmanned aerial vehicle based on reinforcement learning, where the device includes a processor and a memory connected to the processor, and the memory includes program instructions that can be executed by the processor to determine an inclination direction corresponding to the hand pose of a user, the movement direction of the hand, and the angle in the inclination direction based on sensing data associated with the pose of the hand or the movement of the hand acquired by way of at least one sensor, and determine one of a movement direction, a movement speed, a mode change, a figural trajectory, and a scale of the figural trajectory of the unmanned aerial vehicle according to the determined inclination direction, movement direction, and angle.

The program instructions can determine the inclination direction, the movement direction, and the angle corresponding to the pose of the hand or the movement of the hand by way of a first neural network based on reinforcement learning, where the inclination direction and the movement direction can be defined as actions in the reinforcement learning, and the angle can be defined as a state.

The modes can include a direct control mode and a figural trajectory control mode, and in the direct control mode, the program instructions can generate a control command for controlling the unmanned aerial vehicle in a movement direction and a movement speed corresponding to the inclination direction and the angle determined in the first neural network.

The program instructions can determine one of the movement direction, the movement speed, the mode change, the figural trajectory, and the scale of the figural trajectory of the unmanned aerial vehicle according to the determined inclination direction, movement direction, and angle by way of a second neural network based on reinforcement learning, where the scale can be defined as a state in the reinforcement learning.

The modes can include a direct control mode and a figural trajectory control mode, and in the figural trajectory control mode, the program instructions can generate a control command for controlling the unmanned aerial vehicle according to a scale calculated by using a frequency of each inclination direction corresponding to a change in the hand pose and the time passed during a pose change beginning from an initial pose and ending back at the initial pose.

The scale can have a value between 0 and 1 and can be learned and determined differently for each user.

In the figural trajectory control mode, the program instructions can generate a control command for controlling the figural trajectory if a pose change occurs after the initial pose is maintained continuously for a preset number of times or more.

In the figural trajectory control mode, the program instructions can generate a control command for causing the unmanned aerial vehicle to move in one of a circular, spiral, and polygonal trajectory by using the frequency to determine whether or not the pose change of the hand is for a circular trajectory or a cornered trajectory.

The control command can include one of roll, pitch, and yaw data for controlling the unmanned aerial vehicle and, if the pose change of the hand is for a cornered trajectory, can include just the roll and pitch data.

The first and second neural networks can have a reinforced learning-based dueling structure, and the fully connected (FC) layers of the first and second neural networks can each be separated for learning an action value and a state value.

The inclination direction can include an inclination direction for at least one of stop, left, right, forward, backward, forward-right, forward-left, backward-right, and backward-left, and the movement direction can include movement directions associated with a pose for up and down and a change between a direct control mode and a figural trajectory mode.

Also provided is a method of remotely controlling an unmanned aerial vehicle, where the method includes: (a) determining an inclination direction corresponding to the pose of a hand of a user, the movement direction of the hand, and the angle in the inclination direction based on sensing data associated with the hand pose or the hand movement acquired by way of at least one sensor; and (b) determining one of a movement direction, a movement speed, a mode change, a figural trajectory, and a scale of the figural trajectory of the unmanned aerial vehicle according to the determined inclination direction, movement direction, and angle.

According to an embodiment of the disclosure, reinforced learning can be used to accurately differentiate an inclination direction, movement, and arc corresponding to a hand pose.

Also, an embodiment of the disclosure can increase the efficiency of controlling an unmanned aerial vehicle by using two FC layers.

Additional aspects and advantages of the present disclosure will be set forth in part in the description which follows, and in part will be obvious from the description, or may be learned by practice of the invention.

DETAILED DESCRIPTION

As the invention allows for various changes and numerous embodiments, particular embodiments will be illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure. In describing the drawings, like reference numerals are used to represent like components.

Figure 1:
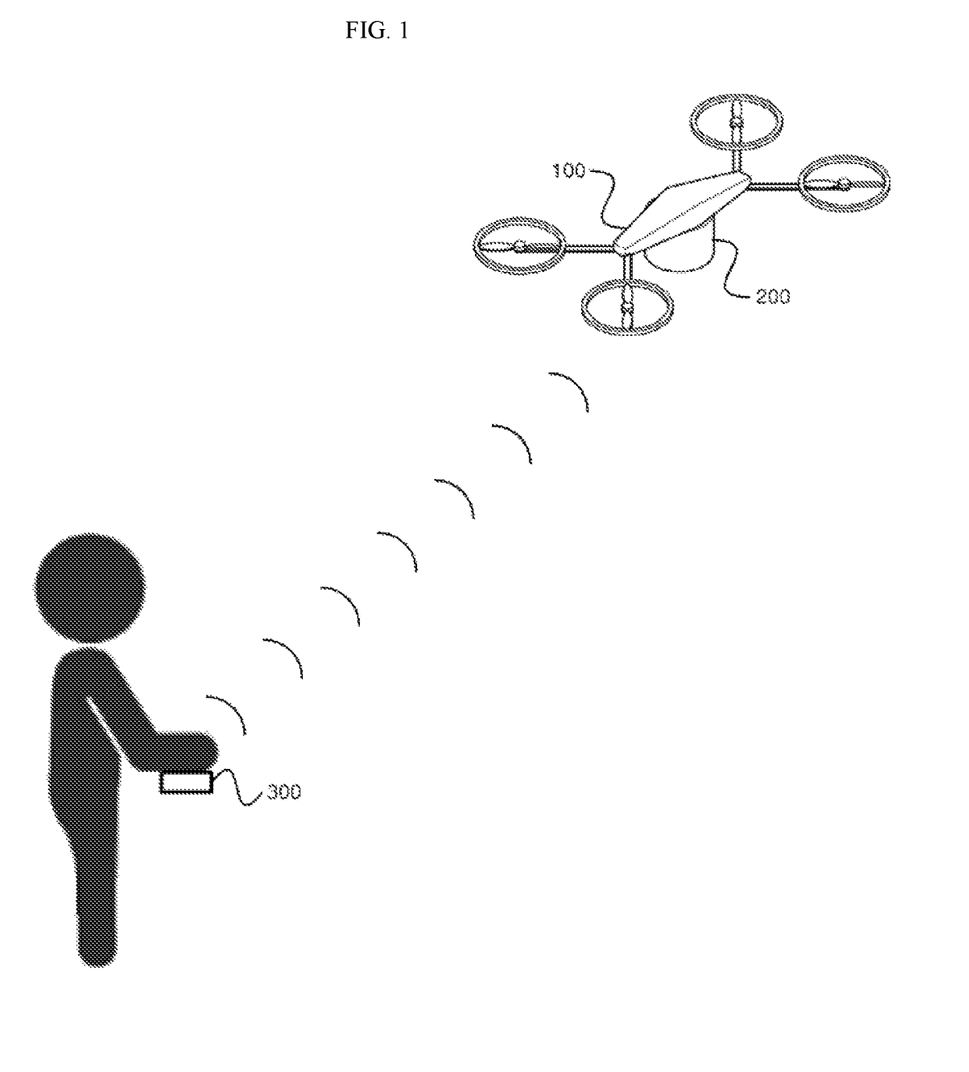
FIG. 1 conceptually illustrates the composition of a UAV remote control system according to an embodiment of the disclosure.

FIG. 1 conceptually illustrates the composition of a UAV remote control system according to an embodiment of the disclosure.

Referring to FIG. 1, a UAV remote control system according to an embodiment of the disclosure may include an unmanned aerial vehicle 100, a movement control device 200, and a remote control device 300. The functions of each component are described below in further detail.

An unmanned aerial vehicle 100 refers to an aircraft that is controlled remotely from the ground without having a pilot on the aircraft itself. FIG. 1 illustrates a quadrotor, which is a drone having four propellers, as an example of an unmanned aerial vehicle 100. However, the invention is not limited thus, and embodiments of the disclosure can be applied to various types of unmanned aerial vehicles 100.

The movement control device 200 is a device that may be attached to a surface, for example a lower surface, or to the inside of the unmanned aerial vehicle 100 to control the movement of the unmanned aerial vehicle 100. The movement control device 200 can control the unmanned aerial vehicle 100 based on control commands transmitted from the remote control device 300.

Figure 2:
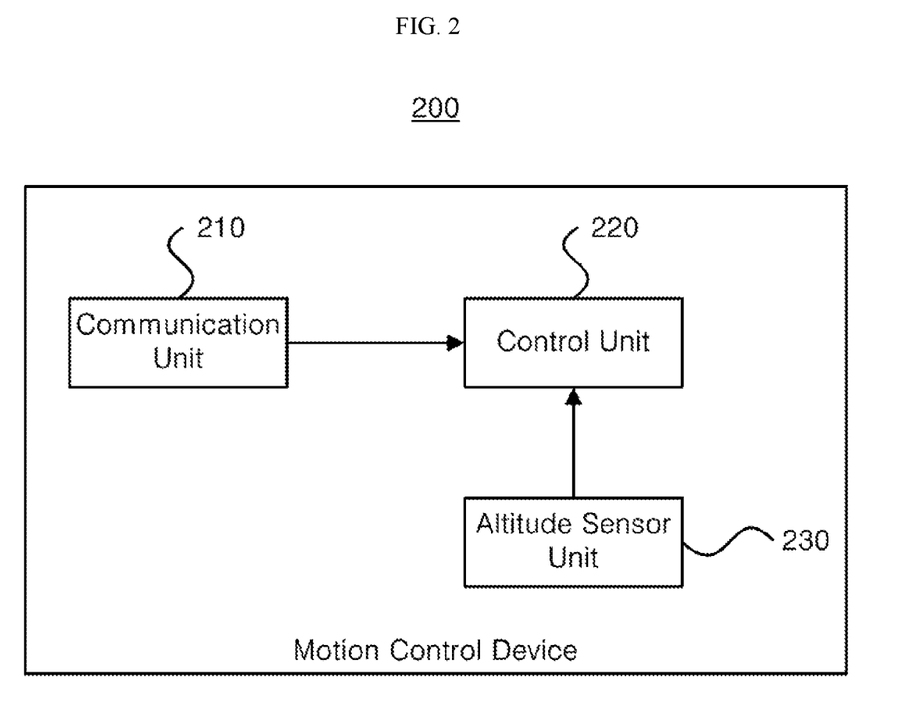
FIG. 2 conceptually illustrates the composition of a movement control device 200 according to an embodiment of the disclosure.

FIG. 2 conceptually illustrates the composition of a movement control device 200 according to an embodiment of the disclosure.

Referring to FIG. 2, a movement control device 200 according to an embodiment of the disclosure may include a communication unit 210, an altitude sensor unit 230, and a control unit 220.

The communication unit 210 may receive the control commands transmitted from the remote control device 300. Here, the communication unit 210 can perform the communication by way of a near-field communication module such as a WiFi module, etc., or by way of a long-range communication module such as an RF module, etc. As regards the received control commands, a more detailed description will be provided later on.

The altitude sensor unit 230 may measure the altitude of the unmanned aerial vehicle 100 as needed for take-off and hovering. The altitude sensor unit 230 can be, for example, a LeddarOne unit.

While a hovering action for the unmanned aerial vehicle 100 can generally be performed by controlling the throttle value of the motors, even a small change in the throttle value can result in a drastic change in altitude if an altitude sensor is not used. In the related art, an ultrasonic sensor may be used, but if the ground surface is not even, diffuse reflection may occur, making it difficult to measure altitude accurately. Thus, an embodiment of the disclosure can use a LeddarOne unit to control take-off and hovering in a stable manner.

The control unit 220 may compute a control value for controlling the unmanned aerial vehicle 100 based on the control command received at the communication unit 210 and the altitude value measured at the altitude sensor unit 230.

Here, the control value can include data associated with one of roll, pitch, and yaw.

The remote control device 300 is a device for remotely controlling the unmanned aerial vehicle 100. Here, the remote control device 300 may generate the control commands for controlling the movement of the unmanned aerial vehicle 100 mentioned above and may transmit the control commands to the movement control device 200.

The remote control device 300 can be a wearable device that is mounted on the user's person, for example on the user's hand and preferably on the user's palm.

The remote control device 300 can, for example, include a processor and a memory that stores instructions executable by the processor.

A CPU (central processing unit) capable of running a computer program or other types of virtual machines, etc., can be included.

The memory can include a non-volatile storage device such as a fixed hard drive or a detachable storage device. A detachable storage device can include a compact flash unit, a USB memory stick, etc. The memory can also include volatile memory such as various types of random access memory.

Program instructions that can be executed by the processor may be stored in such a memory.

Also, the remote control device 300 can include a six-DOF sensor equipped with a gyroscope and accelerometer and can also include a neural network, an operating system for supervised learning and reinforced learning, for controlling the unmanned aerial vehicle 100.

An embodiment of the disclosure can recognize the pose of the user's hand and the hand's movement (gesture) at the remote control device 300 mounted on the hand to efficiently control the unmanned aerial vehicle 100.

In the following, the descriptions will refer to the unmanned aerial vehicle 100 being controlled according to the pose and movement of the hand detected through sensors, in that the remote control device 300 mounted on the hand controls the unmanned aerial vehicle 100.

Figure 3:
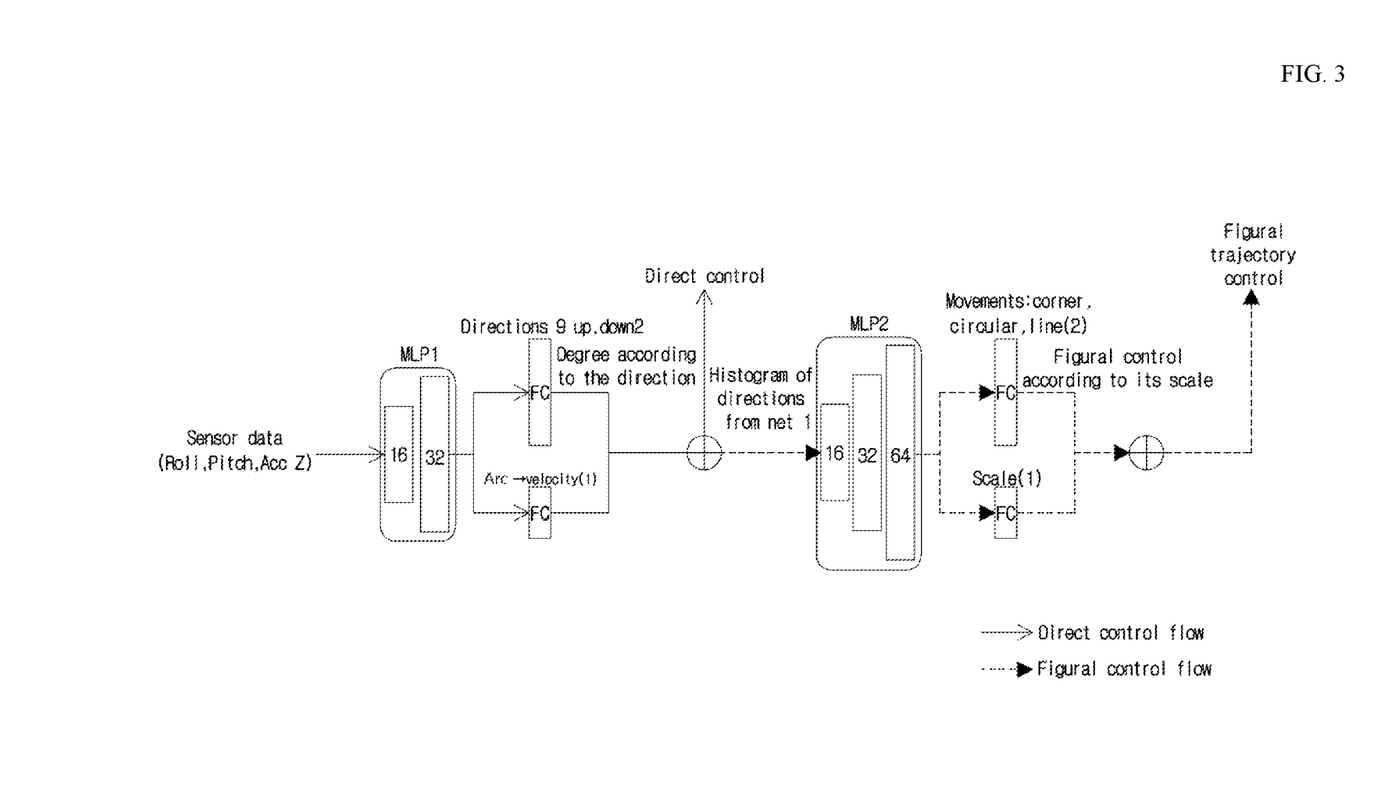
FIG. 3 illustrates procedures by which a remote control device 300 according to an embodiment of the disclosure generates control commands.

FIG. 3 illustrates procedures by which a remote control device 300 according to an embodiment of the disclosure generates control commands.

As illustrated in FIG. 3, a remote control device 300 according to this embodiment can include a first neural network (a multilayer perceptron (MLP1)) and a second neural network (MLP2), which are reinforced learning-based.

Into the first neural network, sensing data associated with the pose and movement of the user's hand may be inputted.

According to this embodiment, the remote control device 300 may be provided with at least one sensor, and the sensor may collect sensing data corresponding to the pose or movement of the user's hand.

For example, the sensor can be a six-DOF sensor equipped with a gyroscope and an accelerometer, and the sensing data can include the roll and pitch data of the gyroscope and the Z-axis data of the gyroscope.

The first neural network may determine the inclination direction corresponding to the pose of the hand, the movement direction of the hand, and the angle in the inclination direction, based on reinforced learning, through the sensing data for the pose of the user's hand or the movement of the hand.

Figure 4:
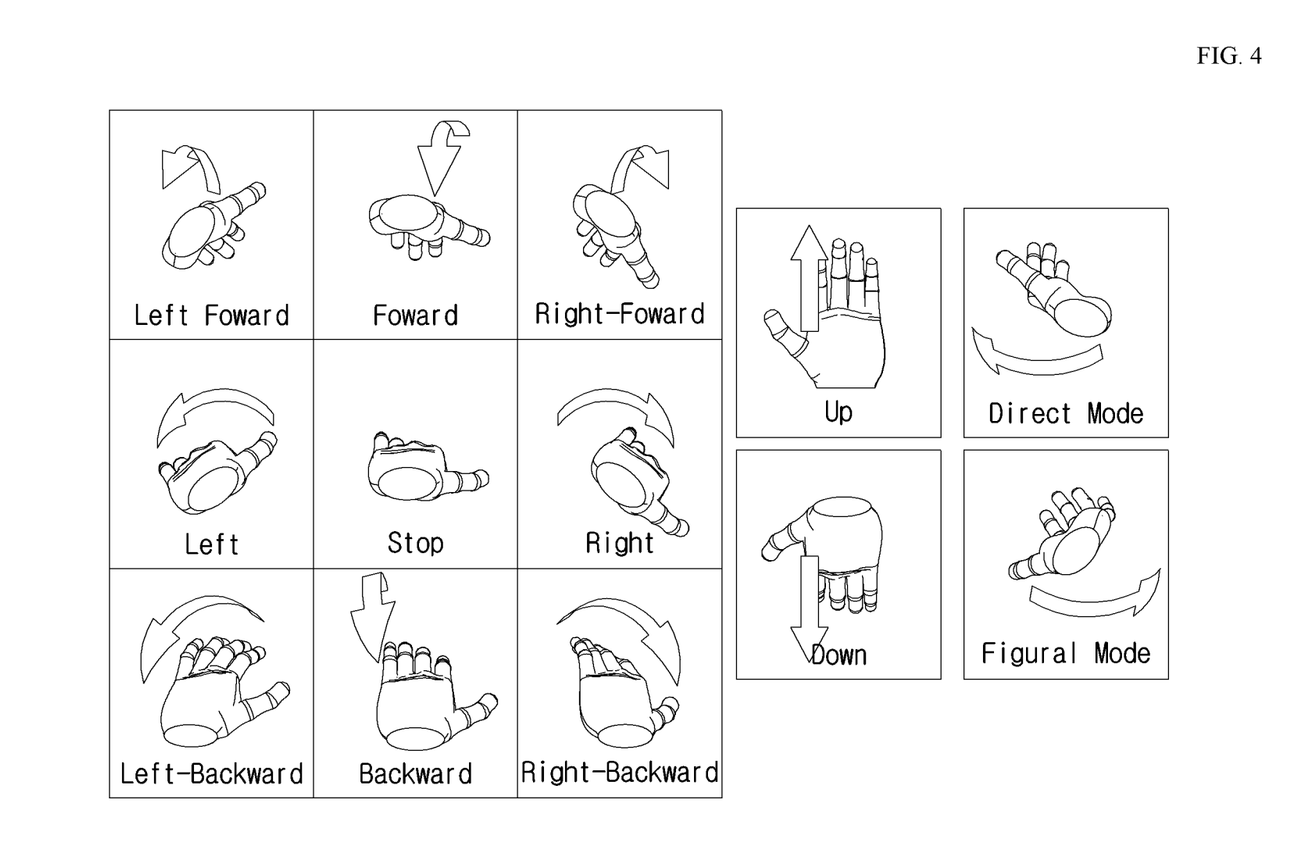
FIG. 4 shows hand poses and movements differentiated in an embodiment of the disclosure.

In this embodiment, the pose of the hand can be differentiated into nine types, and the movement of the hand can be differentiated into four types.

As illustrated in FIG. 4, the pose and movement of the hand can be differentiated into thirteen types in this embodiment.

The pose of the hand can include nine poses corresponding to stop, left, right, forward, backward, forward-right, forward-left, backward-right, and backward-left, as well as four motions for moving up and down and changing between a direct control mode and a figural trajectory mode.

According to this embodiment, the pose of the hand can be defined from a pose in which the back of the hand faces up, i.e. a surface of the remote control device 300 faces upward.

The nine poses can include the hand being horizontal (corresponding to stop), the hand being inclined to the left (move left), the hand being inclined to the right (move right), the front of the hand being inclined down compared to the rear of the hand (move forward), the rear of the hand being inclined down compared to the front of the hand (move backward), the front of the hand being inclined down in a rightward diagonal direction (move forward right), the front of the hand being inclined down in a leftward diagonal direction (move forward left), the rear of the hand being inclined down in a rightward diagonal direction (move backward right), and the rear of the hand being inclined down in a leftward diagonal direction (move backward left).

The four hand movements, from a state in which the palm faces up, can include the movements of moving from down to up (ascend), moving from up to down (descend), moving from right to left (change to direct control mode), and moving from left to right (change to figural trajectory control mode).

According to this embodiment, the first neural network may output a probability value (node value) for the inclination direction and hand movement direction and an angle (arc) in each inclination direction for each of the nine poses described above based on sensing data.

Here, the pose or movement of the largest node value may be determined as the current gesture made by the user's hand, and if the gesture of the user's hand thus determined is one of the nine poses, the node value above may be determined as the angle of the determined hand pose.

The first neural network according to this embodiment may learn based on reinforced learning, where the inclination direction and movement direction may be defined as actions in the reinforced learning, while the angle may be defined as a state. This will be described in further detail later on.

In this embodiment, the direct control mode may be a mode for directly controlling the flight direction of the unmanned aerial vehicle according to hand movements. In the direct control mode, the unmanned aerial vehicle 100 may be controlled according to the inclination direction, the hand's movement direction, and the angle outputted by the first neural network.

Figure 5:
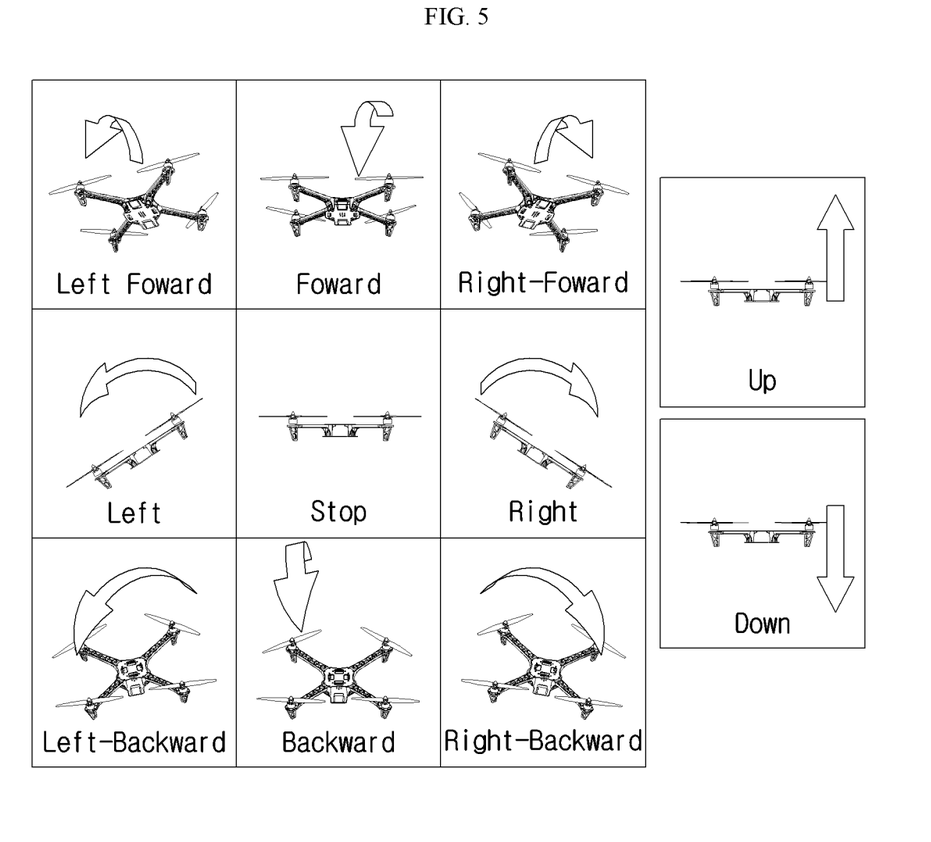
FIG. 5 illustrates direct control actions corresponding to hand poses and movements in an embodiment of the disclosure.

According to the output of the first neural network, the remote control device 300 may transmit a control command to the movement control device 200, and as illustrated in FIG. 5, the unmanned aerial vehicle 100 may fly according to the control of the movement control device 200.

Figure 6:
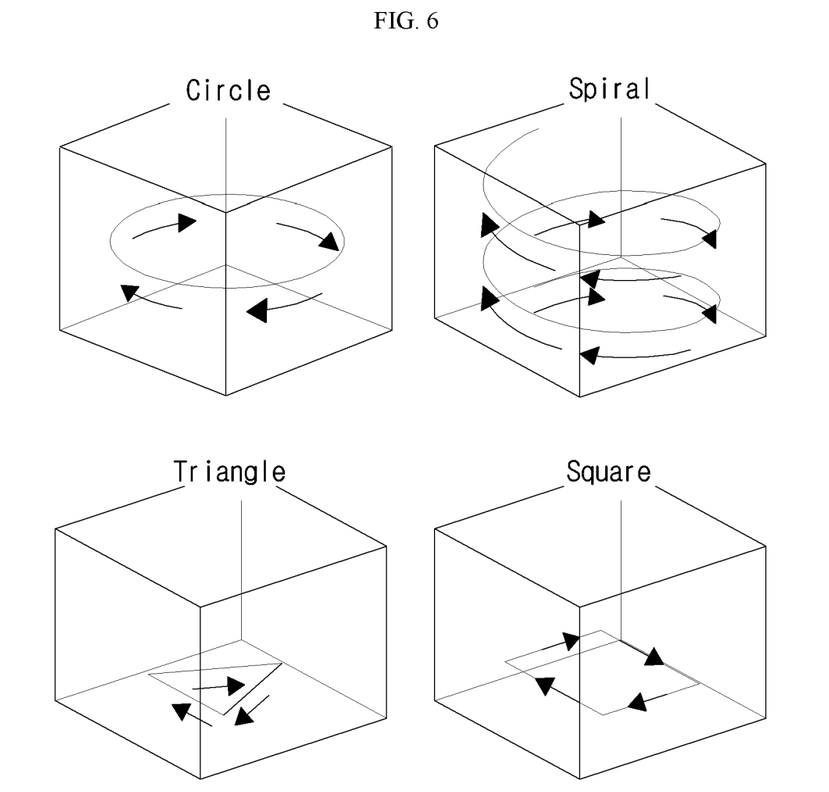
FIG. 6 illustrates a figural trajectory mode according to an embodiment of the disclosure.

As illustrated in FIG. 6, the figural trajectory mode may be a mode that provides control such that the unmanned aerial vehicle moves in a figural trajectory such as in a circle, spiral, triangle, and square.

If the user's hand moves from the left to the right, the mode may be switched from the direct control mode to the figural trajectory mode. Here, the second neural network may determine one of the movement direction, movement speed, mode change, figural trajectory, and scale of the figural trajectory for the unmanned aerial vehicle according to the inclination direction, movement direction, and angle outputted from the first neural network.

The second neural network can also learn based on reinforcement learning, where the scale mentioned above may be defined as a state in the reinforcement learning.

In the figural trajectory control mode, the scale can be defined as the size of the figural trajectory of FIG. 6 and can have a value from 0 to 1. Also, the scale can be learned and determined differently for each user.

The second neural network may calculate the scale by using the frequency of each inclination direction resulting from the pose change of the hand and the time spent from the beginning of the pose change from the initial pose until the hand returns again to the initial pose as outputted from the first neural network.

For example, if the pose of the hand is kept horizontal (stop action) for a preset duration of time before a pose change begins and the hand returns again to a horizontal pose, the second neural network may determine the scale by using the fact that the frequency of the horizontal pose (initial pose) is equal to or greater than a certain number and by using the time taken afterwards from when the hand underwent a pose change until the hand returned to the initial pose.

Also, the second neural network may use the frequency to determine whether the pose change of the hand is for a circular trajectory or a cornered trajectory and thus control the unmanned aerial vehicle 100 to move along one of a circular, spiral, and polygonal trajectory.

For example, if the pose of the hand begins from an initial pose and changes continuously, the eight poses other than the horizontal pose can appear sequentially, and in this case, the second neural network may determine that the pose change of the hand is for a circular trajectory.

On the other hand, if the frequency of the inclination direction corresponding to the pose of the hand shows the left, right, forward, and backward poses appearing sequentially in certain numbers, then the second neural network may determine this to be for a cornered trajectory.

The remote control device 300 may, in the direct control mode and the figural trajectory mode, use the first neural network and second neural network described above to generate control commands for controlling the unmanned aerial vehicle 100.

According to this embodiment, in cases where the pose change of the hand is for a cornered trajectory, a control command can include roll and pitch data, and in cases for a circular trajectory, a control command can additionally include yaw data.

In a preferred embodiment of the disclosure, reinforcement learning may be employed to increase the differentiation performance in the neural networks.

A more detailed description of the reinforced learning is provided below.

In reinforced learning, an autonomous agent may observe a state $s_t$ at time t from its environment. The autonomous agent may perform an action at state $s_t$ to interact with the environment.

When the agent performs an action, then based on the action performed for the current state, the environment and the agent may be changed to a new state $s_{t+1}$. Every time the environment is changed to a new state $s_{t+1}$, a reward $r_{t+1}$ may be provided to the agent.

The goal of the agent is to learn a Markov process in which the current state affects the next state or the future is conditionally independent of the past in the current state.

In the Markov decision process (MDP), the agent acquires an observed value $o_t \in \Omega$. Here, the distribution for the next observed value $p(o_{t+1}|s_{t+1}, a_t)$ is dependent on the current state and the previous action. The state value function $V^\pi(s)$ is the expected profit starting at state s and following $\pi$.

$$V^\pi(s) = E[R|s,\pi] \quad \text{[Formula 1]}$$

The optimum $\pi^*$ has a corresponding state value function $V^*(s)$ and vice versa. The optimum state value function can be defined as follows.

$$V^*(s) = \max_\pi V^\pi(s) \quad \text{[Formula 2]}$$

In the reinforced learning setup, turnover kinetics T cannot be used. Therefore, another function $Q^\pi(s,a)$ similar to V may be established. Here, the initial action a is provided, and $\pi$ is continued only in subsequent states.

$$Q(s_t,a_t,\theta) \quad \text{[Formula 3]}$$

In a deep Q network (DQN), it may be difficult to calculate the Q function due to the problem of high-dimensional spaces. One possible solution is to find an approximate value by using a deep neural network.

Here, $\theta$ is a parameter of the deep neural network. In the learning for the network, the following loss function calculated with the target value of the network may be used for optimization.

$$\text{Loss} = \|y_t^{DQN} - Q(s_t,a_t,\theta)\| \quad \text{[Formula 4]}$$

$$y_t^{DQN} = R_{t+1} + \gamma \max Q(s_{t+1},a_{t+1},\theta^-) \quad \text{[Formula 5]}$$

Here, $\theta^-$ refers to a fixed parameter of the targeted network.

While learning the parameters of the network is possible, using the online parameter $\theta$ during learning may not be correctly performed in practice. This is a well known problem of standard Q-learning.

Mnih et al. proposed a solution capable of improving the stability of the network by updating all predefined steps to freeze the parameters of the target network $Q(s_{t+1}, a_{t+1}; \theta^-)$.

Here, $\theta^-$ is a parameter updated to a predefined step.

$$e_t = (e_t, a_t, r_t, s_{t+1}) \quad \text{[Formula 6]}$$

$$D = e_1, e_2, \ldots, e_t \quad \text{[Formula 7]}$$

To delete the correlations of all experiences accumulated in the buffer, which may greatly lower the stability of the network, the DQN may use a technique known as experience replay. Formulas 6 and 7 illustrate a way in which experiences may accumulate in the buffer, where $s_t$ is a state, $a_t$ is an action, and $r_t$ is a reward.

Through experience replay, the network may use a mini-batch of D experiences sampled randomly instead of using sequentially accumulated data.

Instead of using another value to select and evaluate an action, the dueling deep Q network (dueling DQN) proposed by Wang et al. (2016) separates the network into a value network and an advantage network. The value network evaluates the quality of the states, while the advantage network evaluates the quality of each action.

In this embodiment, a dueling structure for deep reinforced learning is proposed for use in the training.

In the dueling structure, the fully connected (FC) layers of a neural network may each be separated for learning action values and state values and may be connected to the terminal end with one value representing a state corresponding to an action.

In the Dueling DQN, there are several equations for estimating $Q(s_t, a_t, \theta, \alpha, \beta)$.

$$Q(s_t, a_t, \theta, \alpha, \beta) = V(s_t, \theta, \beta) + A(s_t, a_t, \theta, \alpha) \quad \text{[Formula 8]}$$

$$Q(s_t, a_t, \theta, \alpha, \beta) = V(s_{t+1}, \theta, \beta) + \quad \text{[Formula 9]}$$
$$\left(A(s_{t+1}, a_{t+1}, \theta, \alpha) - \max_{a_{t+1} \in |A|} A(s_{t+1}, a_{t+1}, \theta, \alpha)\right)$$

$$Q(s_t, a_t, \theta, \alpha, \beta) = \quad \text{[Formula 10]}$$
$$V(s_t, \theta, \beta) + A(s_t, a_t, \theta, \alpha) - \frac{1}{A} \sum_{a'}^{|a|} A(s_t, a'_t, \theta, \alpha)$$

Formula 8 shows a method of generating the Q value by adding functions V and A, but the advantage function estimator has to have an advantage of 0 in the action selected in Formula 9. In Formula 10, the maximum operator is replaced with an average. When predicting the action value, the state value may be used.

In this embodiment, the actions for the reinforced learning can be interpreted as the inclination direction or movement described above (e.g. an inclination direction corresponding to a pose of the hand and a movement for ascending, descending, and switching modes), and the arc or scale can be regarded as state values.

In addition to providing a high performance by using two separated layers (FC layers) at the terminal end of the neural network, there is also the advantage that one neural network module can be used to predict the direction and the corresponding arc.

As illustrated in FIG. 3, a first neural network according to this embodiment can include an $FC_{direction}$ layer for estimating the hand pose or movement and an $FC_{arc}$ layer for estimating the arc.

Accordingly, the output of the first neural network may be defined as follows.

$$Net1(X, \text{zone}; \theta) = FC_{arc}(X; \theta) + \left( FC_{direction}(X; \theta) - \frac{1}{|\text{direction}|} \sum_{zone} FC_{direction}(x, \text{zone}; \theta) \right) \quad \text{[Formula 11]}$$

Here, $\theta$ is the weight of the first neural network (Net1), X is the roll and pitch corresponding to the hand pose or movement and the Z-axis data of the accelerometer, and |direction| is the number of inclination directions or movement directions. Thus, the zone is defined according to the current sensing data as argmax $Net1(X;\theta)$, and the corresponding arc is $Net1(y=\text{argmax } Net1(X;\theta)|X;\theta)$. To collect learning data for the arc, 2,500 sets of data may be collected, with labels from 0 to 1.0 in units of 0.1. As there are 2,500 in each zone, the total number of data sets for one person is 32,500.

The learning target value of the direct control mode may be as follows.

$$\text{Target} = \begin{cases} \text{arc} & \text{if } Net1(y = \text{currentzone} | X; \theta) \\ 0 & \text{if } Net1(y \neq \text{currentzone} | X; \theta) \end{cases} \quad \text{[Formula 12]}$$

The definition of the loss function may be as follows.

$$\text{Loss} \frac{1}{n} \sum_{i}^{n} (Net1(X_i; \theta) - \text{Target}_i)^2 \quad \text{[Formula 13]}$$

Using the loss value, back propagation and gradient descent optimization may be performed.

Referring again to FIG. 3, if the inclination direction corresponding to the current hand pose and the corresponding arc value have been outputted through the first neural network, then the linear speed and angular speed may change according to the output, so that the unmanned aerial vehicle can be manipulated in a corresponding direction.

After extensive learning, the differentiation accuracy may be measured through argmax $Net1(X;\theta)$, and the arc value may be measured through root mean square error (RMSE). The differentiation accuracy of a 10-fold cross validation using the data of twelve subjects showed 91%, and the RMSE for arc value prediction was 0.12. Using an Nvidia Titan X GPU, 200 gradient descent procedures were performed with an Adam optimization tool ($\alpha$=0.01). The learning time was about 1 minute on average.

In the test, the average execution time of the first neural network was 0.054 seconds.

In the direct control mode, when the first neural network outputs a movement direction such as one of the nine inclination directions, ascend, and descent, then a control command may be transmitted immediately to the movement control device 200 of the unmanned aerial vehicle 100.

However, to prevent unintended controls after a mode change, the program may be configured to check whether or not the first neural network outputs the corresponding segment continuously for 2 seconds.

Second, a description is provided on how a figural trajectory may be generated by using hand pose sequences.

The nine outputs (directions) provided from the first neural network may be used as input for the second neural network.

As described above, a hand pose sequence may be processed as a frequency of inclination directions in the first neural network.

Thus, the processed data may have the nine outputs, and each may have a frequency distribution value from the hand pose sequence.

By using such a predetermined mapping method, learnable data of a fixed size can be created within the trajectory made with the hand.

The path of the unmanned aerial vehicle may be generated differently for the cornered trajectory and the circular trajectory.

That is, when differentiated as a circular action and not a corner, the path may be generated in consideration of the yaw (rotation with respect to the vertical direction of the unmanned aerial vehicle). The path may be formed by the accumulated output of the first neural network when the user draws a trajectory with the hand.

In the figural trajectory control mode, the program may calculate a stop signal of the first neural network to ascertain the start and finish of the trajectory from the user. That is, when the stop signal is continued for a certain duration or longer, it may be recognized that the drawing of a trajectory has begun, and the recording of the sensing data may begin. If the stop signal continues for 1 second or longer, then the data recording may be halted, and the sequential output of the first neural network may be used for generating the path.

If an identical zone (the same inclination direction) is outputted continuously from the first neural network, the buffer may fill the ratio $$r_{current} = \frac{\text{frequency}_{currentzone}}{\text{frequency}_{tollength}}$$

sequentially.

A scale factor may be multiplied to all ratios stacked in the buffer to determine the time (seconds) for moving in the corresponding direction.

That is, if a first zone of a particular range appears more continuously compared to other zones, then the unmanned aerial vehicle may move longer in the direction corresponding to the first zone.

If the input of the second neural network is differentiated as a cornered trajectory, the data of the buffer may control the unmanned aerial vehicle through roll and pitch. In the case of a circle, the roll, pitch, and yaw of the unmanned aerial vehicle may be controlled according to whether the direction is clockwise or counter-clockwise.

For example, if the sequence shows Forward→Left Forward, then the direction of the movement may be counter-clockwise, whereas if the sequence shows Forward→Right Forward, the direction of the movement may be clockwise.

When the second neural network determines which figural trajectory to generate, the corresponding flight parameters may be generated in real time. This will be described in further detail later on.

The scale S of the trajectory may be created in a manner similar to the method used by the first neural network for the arc. For each motion (circular, cornered) from 0 to 1 gradually drawn larger according to the guidance of the program, a particular number of markings may be shown.

Thus, similar to the first neural network, the output of the second neural network can be defined as follows.

$$Net2(X, move; \theta) = FC_{scale}(X; \theta) + \quad \text{[Formula 14]}$$
$$FC_{move}(X; \theta) - \frac{1}{|move|} \sum_{move} FC_{move}(X, \text{scale}; \theta)$$

$$\text{Target} = \begin{cases} \text{scale} & \text{if} Net2(y = currentzone \mid X; \theta) \\ 0 & \text{if} Net2(y \neq currentzone \mid X; \theta) \end{cases} \quad \text{[Formula 15]}$$

The loss function, learning parameters, and evaluation method may the same as for the learning of the first neural network (direct control) mentioned above.

The differentiation accuracy measured using argmax Net2 was 94%, and the RMSE for the scale prediction using Net2(y=argmax Net2(X;q)|X;q) was 0.01. When using Raspberry Pi Zero, the time spent for the prediction and path generation was about 0.95 seconds.

A more detailed description on the process for controlling an unmanned aerial vehicle is provided below.

As mentioned above, there may be two modes for controlling an unmanned aerial vehicle. One is the direct control (or direction command) mode, and the other is the figural trajectory control mode. The two modes may both control the linear acceleration and angular speed of the unmanned aerial vehicle.

Firstly, in direct control, the Up and Down zones may set $V_{hand}$ to 1 or -1 to control the vertical speed such that the unmanned aerial vehicle ascends or descends. For movement control in the forward and backward directions, $pitch_{hand}$ may be set to +1 or -1. For the Left and Right zones, $roll_{hand}$ may be set to -1 or +1.

For diagonal directions, a combination of these values may be transmitted to the unmanned aerial vehicle. Therefore, in direct control, the control command sent to the unmanned aerial vehicle after the roll and pitch of the hand are measured may be as follows.

$$V_{drone} = V_{hand} * \max_{speed}$$
$$roll_{drone} = roll_{hand} * arc * \max_{angle}$$
$$pitch_{drone} = pitch_{hand} * arc * \max_{angle} \quad \text{[Formula 16]}$$

Secondly, in figural trajectory control, the Roll, Pitch, and Yaw commands for setting the $pose_{drone}$ of the unmanned aerial vehicle may be as follows.

$$roll_{drone} = roll_{hand} * arc * \max_{angle} \quad \text{[Formula 17]}$$
$$pitch_{drone} = pitch_{hand} * arc * \max_{angle}$$
$$yaw_{drone} = \frac{rotationspeed}{S}$$

To prevent the unmanned aerial vehicle from moving too fast, $\max_{angle}$ and $\max_{speed}$ may be set to 60 and 1, respectively. To reflect the scale, each $pose_{drone}$ may be sent to the drone for a time duration of $S*\max_{second}*r_{current}$. As mentioned above, the Yaw rotation value may be used only in the control for a circular trajectory.

In experiments, the Yaw rotation speed was set to +, -0.5 according to the clockwise direction and counter-clockwise direction. However, if the rotation speed is too fast, the unmanned aerial vehicle can move in a small circle in spite of the large scale, and if the rotation speed is too slow, the unmanned aerial vehicle may not move in a circle. Therefore, the Yaw control value may be adjusted according to the scale of the circular trajectory control. In figural trajectory control, the arc value may not be used in order that the trajectory may form a better shape as intended by the user.

The $roll_{drone}$, $pitch_{drone}$, and $yaw_{drone}$ above may be converted to quaternions and transmitted to the unmanned aerial vehicle.

The embodiments of the disclosure described above are provided merely for illustrative purposes. A person having ordinary skill in the art would be able to make various modifications, alterations, and additions without departing from the spirit and scope of the invention, and such modifications, alterations, and additions are to be regarded as being encompassed within the scope of claims set forth below.

What is claimed is:

1. A device for remotely controlling an unmanned aerial vehicle based on reinforcement learning, the device comprising:
   a processor; and
   a memory connected to the processor,
   wherein the memory includes program instructions executable by the processor to:
   determine an inclination direction corresponding to a pose of a hand of a user, a movement direction of the hand, and an angle in the inclination direction based on sensing data associated with the pose of the hand or the movement direction of the hand, the sensing data acquired by way of at least one sensor, and
   determine a movement direction of the unmanned aerial vehicle, a movement speed, a mode change, a figural trajectory, and a scale of the figural trajectory of the unmanned aerial vehicle according to the inclination direction of the pose of the hand, the movement direction of the hand, and the angle in the inclination direction,
   wherein the program instructions:
   determine the inclination direction and the angle corresponding to the pose of the hand and the movement direction of the hand by way of a first neural network based on reinforcement learning, and
   determine the movement direction of the unmanned aerial vehicle, the movement speed, the mode change, the figural trajectory, and the scale of the figural trajectory of the unmanned aerial vehicle according to the inclination direction of the pose of the hand, the movement direction of the hand, and the angle in the inclination direction by way of a second neural network based on the reinforcement learning,
   wherein modes include a direct control mode and a figural trajectory control mode,
   in the direct control mode, the program instructions:
   generate a first control command for controlling the unmanned aerial vehicle in the movement direction and the movement speed corresponding to the inclination direction and the angle corresponding to the pose of the hand, and the movement direction of the hand determined in the first neural network,
   in the figural trajectory control mode, the program instructions:
   generate a second control command for controlling the unmanned aerial vehicle according to the scale calculated by using a frequency of each inclination direction corresponding to a change in the pose of the hand and a time passed during the change in the pose of the hand beginning from an initial pose and ending back at the initial pose and for causing the unmanned aerial vehicle to move in one of a circular, spiral, and polygonal trajectory by using the frequency to determine whether the change in the pose of the hand is for the circular trajectory or a cornered trajectory, wherein, in the figural trajectory control mode, the program instructions:

generate the second control command for controlling the figural trajectory if the change in the pose of the hand occurs after the initial pose is maintained continuously for a preset amount of time.

2. The device of claim 1, wherein the inclination direction and the movement direction of the hand are defined as actions and the angle is defined as a state in the first neural network.

3. The device of claim 1, wherein the direct control mode is a mode for directly controlling a flight direction of the unmanned aerial vehicle according to movements of the hand of the user, and the figural trajectory control mode is a mode that provides control such that the unmanned aerial vehicle moves in the figural trajectory, and wherein the figural trajectory comprises a circle, spiral, triangle, and square.

4. The device of claim 1, wherein the scale is defined as a state in the second neural network.

5. The device of claim 1, wherein the sensor includes a six-degrees of freedom (DOF) sensor equipped with a gyroscope and an accelerometer and the sensing data includes roll and pitch data of the gyroscope and Z-axis data of the gyroscope.

6. The device of claim 1, wherein the scale has a value between 0 and 1 and is learned and determined differently for each user.

7. The device of claim 1, wherein the scale is defined as a size of the figural trajectory.

8. The device of claim 7, wherein when the change in the pose of the hand is for the cornered trajectory, the second control command includes roll and pitch data, and wherein when the change in the pose of the hand is for the circular trajectory, the second control command additionally includes yaw data.

9. The device of claim 1, wherein the first and second neural networks have a reinforced learning-based dueling structure, and a fully connected (FC) layer of the first and second neural networks is separated for learning an action value and a state value.

10. The device of claim 1, wherein the inclination direction comprises inclination directions for stop, left, right, forward, backward, forward-right, forward-left, backward-right, and backward-left, and the movement direction of the hand comprises movement directions associated with the pose of the hand for up and down and the mode change between the direct control mode and the figural trajectory control mode.

11. A method for controlling an unmanned aerial vehicle remotely, the method comprising:

(a) determining an inclination direction corresponding to a pose of a hand of a user, a movement direction of the hand, and an angle in the inclination direction based on sensing data associated with the pose of the hand or the movement direction of the hand, the sensing data acquired by way of at least one sensor; and (b) determining a movement direction the unmanned aerial vehicle, a movement speed, a mode change, a figural trajectory, and a scale of the figural trajectory of the unmanned aerial vehicle according to the determined inclination direction, movement direction, and angle, wherein the method further comprising:

determining the inclination direction and the angle corresponding to the pose of the hand and the movement direction of the hand by way of a first neural network based on reinforcement learning, and determining the movement direction the unmanned aerial vehicle, the movement speed, the mode change, the figural trajectory, and the scale of the figural trajectory of the unmanned aerial vehicle according to the determined inclination direction, movement direction, and angle by way of a second neural network based on the reinforcement learning, wherein modes include a direct control mode and a figural trajectory control mode, in the direction control mode, the method further comprising:

generating a first control command for controlling the unmanned aerial vehicle in the movement direction and the movement speed corresponding to the inclination direction and the angle corresponding to the pose of the hand, and the movement direction of the hand determined in the first neural network, in the figural trajectory control mode, the method further comprising:

generating a second control command for controlling the unmanned aerial vehicle according to the scale calculated by using a frequency of each inclination direction corresponding to a change in the pose of the hand and a time spent from a beginning of the pose change from an initial pose until the hand returns again to the initial pose and for causing the unmanned aerial vehicle to move in one of a circular, spiral, and polygonal trajectory by using the frequency to determine whether the change in the pose of the hand is for the circular trajectory or a cornered trajectory, wherein, in the figural trajectory control mode, the program instructions:

generate the second control command for controlling the figural trajectory if the change in the pose of the hand occurs after the initial pose is maintained continuously for a preset amount of time.

* * * * *